(12) United States Patent
Evans et al.

(10) Patent No.: US 9,243,848 B2
(45) Date of Patent: Jan. 26, 2016

(54) WATER HEATING SYSTEM

(75) Inventors: Craig Evans, Westwood, NJ (US);
Craig E. Williams, Bloomfield, NJ (US); Earl Rightmier, Marcy, NY (US)

(73) Assignee: Aerco International, Inc., Blauvelt, NY (US)

( * ) Notice: Subject to any disclaimer, the term of this patent is extended or adjusted under 35 U.S.C. 154(b) by 281 days.

(21) Appl. No.: 13/357,309

(22) Filed: Jan. 24, 2012

(65) Prior Publication Data

US 2012/0192813 A1 Aug. 2, 2012

Related U.S. Application Data

(60) Provisional application No. 61/437,527, filed on Jan. 28, 2011.

(51) Int. Cl.
*F24H 1/28* (2006.01)
*F28D 7/02* (2006.01)
(Continued)

(52) U.S. Cl.
CPC *F28D 7/024* (2013.01); *F23N 5/00* (2013.01); *F24H 1/28* (2013.01); *F24H 9/2035* (2013.01);
(Continued)

(58) Field of Classification Search
CPC ....... F28D 7/024; F24H 1/285; F24H 9/2035; F24H 1/28; F23N 5/00; F23N 2023/34; G05B 13/02; G05D 23/1931; G05D 23/1919
USPC .......... 122/20 B, 15.1, 18.4, 16.1, 18.1, 14.1, 122/24
See application file for complete search history.

(56) References Cited

U.S. PATENT DOCUMENTS 3,705,574 A * 12/1972 Duncan ........................ 122/14.2
4,305,547 A 12/1981 Cohen
(Continued)

FOREIGN PATENT DOCUMENTS

EP 1867923 A2 12/2007
JP 60185050 A 9/1985
(Continued)

OTHER PUBLICATIONS

Korean Intellectual Property Office, International Search Report and Written Opinion of the International Searching Authority for Corresponding International Patent Application No. PCT/US2012/022516 dated Sep. 5, 2012 (10 pgs).
(Continued)

*Primary Examiner* — Steven B McAllister
*Assistant Examiner* — Steven Anderson, II
(74) *Attorney, Agent, or Firm* — Harris Beach PLLC (57) ABSTRACT

A water heating system includes a burner assembly for providing a source of thermal energy to a heat exchanger. A water inlet conduit is coupled to the heat exchanger assembly for supplying fresh water to be heated, and a water exit conduit is coupled to the heat exchanger assembly for delivering the heated water to a point of use. A bypass conduit connects the water exit conduit to the water inlet conduit, and a pump disposed in the bypass conduit circulates at least a portion of the heated water from the water exit conduit to the water inlet conduit. A feed-forward sensor positioned in the water inlet conduit between the heat exchanger assembly and the bypass conduit monitors a parameter of the water entering the heat exchanger assembly, and a processor controls the operation of the of the burner assembly in response to the feed-forward sensor.

25 Claims, 7 Drawing Sheets

(51) Int. Cl.
*F24H 9/20* (2006.01)
*F23N 5/00* (2006.01)
*G05D 23/19* (2006.01)
*G05B 13/02* (2006.01)

(52) U.S. Cl.
CPC ............ *G05B 13/02* (2013.01); *G05D 23/1919* (2013.01); *G05D 23/1931* (2013.01); *F23N 2023/34* (2013.01)

(56) References Cited

U.S. PATENT DOCUMENTS

| | | | | |
|---|---|---|---|---|
| 4,569,310 A | * | 2/1986 | Davis | 122/24 |
| 4,624,219 A | * | 11/1986 | McCorquodale | 122/170 |
| 4,852,524 A | | 8/1989 | Cohen | |
| 5,020,512 A | * | 6/1991 | Vago et al. | 122/18.2 |
| 5,044,705 A | * | 9/1991 | Nelson | 312/228 |
| 5,881,681 A | | 3/1999 | Stuart | |
| 6,435,862 B1 | | 8/2002 | Fioriti et al. | |
| 6,445,880 B1 | | 9/2002 | Hollander et al. | |
| 6,694,926 B2 | * | 2/2004 | Baese et al. | 122/14.2 |
| 6,904,874 B1 | | 6/2005 | Pouchak et al. | |
| 2006/0102733 A1 | * | 5/2006 | York et al. | 237/19 |
| 2007/0126320 A1 | * | 6/2007 | Huang | 312/236 |
| 2007/0257122 A1 | | 11/2007 | Shimada et al. | |
| 2008/0191046 A1 | * | 8/2008 | Cloutier | 237/19 |
| 2008/0216771 A1 | | 9/2008 | Paine | |
| 2009/0064944 A1 | * | 3/2009 | Paine | 122/14.22 |
| 2009/0151653 A1 | | 6/2009 | Mullen et al. | |
| 2009/0308580 A1 | * | 12/2009 | Yumoto | 165/120 |
| 2010/0195991 A1 | | 8/2010 | Deivasigamani et al. | |

FOREIGN PATENT DOCUMENTS

| | | |
|---|---|---|
| JP | 02089951 | 3/1990 |
| JP | 2005021426 A | 1/2005 |
| JP | 2005180782 A | 7/2005 |
| JP | 2008032381 A | 2/2008 |
| JP | 2010091178 A | 4/2010 |
| JP | 2010175160 A | 8/2010 |
| KR | 940004171 B1 | 5/1994 |
| KR | 0181631 B1 | 3/1999 |
| WO | WO-199966262 A1 | 12/1999 |

OTHER PUBLICATIONS

Japanese Patent Office Notice of Reason for Rejection (First Office Action) for corresponding Japanese Patent Application No. 2013-551303, date of mailing Nov. 4, 2015 in the English and Japanese languages (8 pgs).

* cited by examiner

WATER HEATING SYSTEM

CROSS REFERENCE TO RELATED APPLICATION

Reference is made to and this application claims priority from and the benefit of U.S. Provisional Application Ser. No. 61/437,527, filed Jan. 28, 2011, entitled "TANKLESS WATER HEATER", which application is incorporated herein in its entirety by reference.

FIELD OF THE INVENTION

This disclosure relates generally to a water heating system and, more specifically, to a water heating system and method utilizing feed-forward control.

BACKGROUND OF THE INVENTION

In both household and commercial applications, water heaters are mostly of the tank type. These water heaters are cylindrical containers in which water is kept continuously hot and ready for use. The water in the tank will cool down after a while which causes the heating system to activate to heat the water back up. Additionally, once the supply of hot water from the tank has been depleted, there is a delay before hot water is available again.

Tankless water heaters heat water as it flows through the device and typically do not retain any water internally except for what is in the heat exchanger coil. A challenge for conventional tankless water heaters is to output the same temperature of water at differing flow rates. In addition, over time the heat exchangers can suffer corrosion and efficiency is reduced.

SUMMARY OF THE INVENTION

In one aspect of the invention, a water heating system includes a burner assembly for providing a source of thermal energy. The burner assembly includes a combustion chamber, an air intake to supply an air stream to the combustion chamber, and a fuel inlet to supply fuel to the combustion chamber. A heat exchanger assembly is operatively coupled to the burner assembly, and includes a first fluid conduit in heat exchange relationship with a second fluid conduit. The water heating system further includes a water inlet conduit coupled to the heat exchanger assembly for supplying fresh water to be heated, and a water exit conduit coupled to the heat exchanger assembly for delivering the heated water to a point of use. A bypass conduit connects the water exit conduit to the water inlet conduit, and a pump disposed in the bypass conduit circulates at least a portion of the heated water from the water exit conduit to the water inlet conduit. A feed-forward sensor positioned in the water inlet conduit between the heat exchanger assembly and the bypass conduit monitors a parameter of the mixed water entering the heat exchanger assembly, and a processor controls the operation of the of the burner assembly in response to the feed-forward sensor.

In another aspect of the invention, a method for operating a water heating system is provided. The method includes a step of providing a heat exchanger assembly, a water inlet conduit for supplying water to the heat exchanger assembly, a water exit conduit connected to the heat exchanger assembly for supplying heated water to a demand, a heat source for heating the water in the heat exchanger assembly, and a bypass conduit connecting the water exit conduit to the water inlet conduit. The method further includes the steps of heating water in the heat exchanger to a set point temperature, and mixing at least a portion of the heated water from the bypass conduit with the water in the water inlet conduit. The method further includes the steps of monitoring a first parameter of the water in the water inlet conduit prior to entry into the heat exchanger assembly, and controlling the heat source in response to the first parameter of the water to achieve the set point temperature at the water exit conduit.

BRIEF DESCRIPTION OF THE DRAWINGS

The features described herein can be better understood with reference to the drawings described below. The drawings are not necessarily to scale, emphasis instead generally being placed upon illustrating the principles of the invention. In the drawings, like numerals are used to indicate like parts throughout the various views.

DETAILED DESCRIPTION OF THE INVENTION

Figure 1:
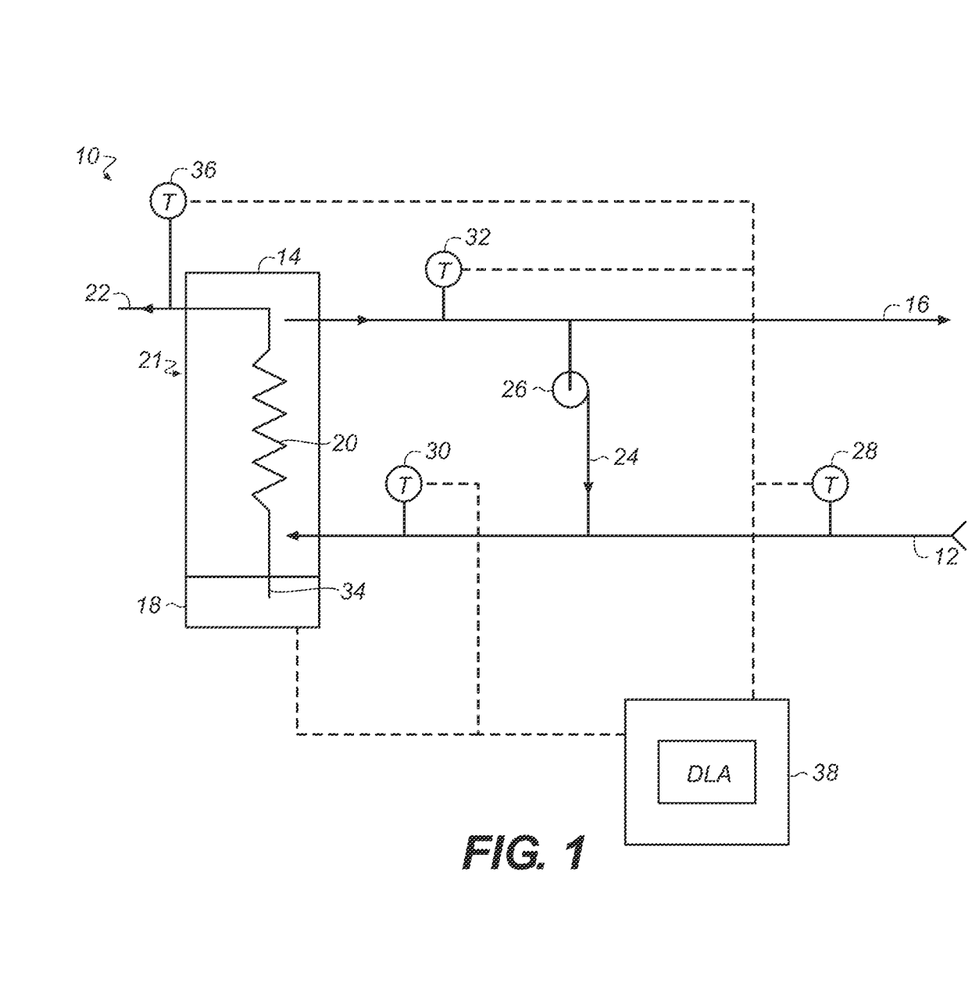
FIG. 1 depicts a schematic diagram of a water heating system according to one embodiment of the present invention.

FIG. 1 depicts a schematic diagram of a water heating system 10 according to one embodiment of the invention. Fresh water is supplied to the water heating system 10 by a water inlet conduit 12. Water in the conduit 12 enters a heat exchanger assembly 14 where the water is heated to a desired or set point temperature and discharged to a water exit conduit 16. The heated water is then available to satisfy the demands of the home or facility.

The water heating system 10 includes a burner assembly 18 adapted to burn a fuel with an oxidizer in a combustion chamber to produce heated products of combustion. In typical systems, the oxidizer is air. The products of combustion (hot gas) exit the burner assembly 18 and are provided to the heat exchanger assembly 14 whereupon they enter a heat exchange relationship with the water circulating through the heat exchanger assembly. Within the heat exchanger assembly 14, the water is isolated from the products of combustion. That is, a first fluid conduit 20 is in heat exchange relationship with a second fluid conduit 21, but they are not commingled. In the illustrated embodiment, the first fluid conduit 20 is one or more heat exchange tubes within the heat exchanger and the second fluid conduit 21 is the interior region of the heat exchanger surrounding the heat exchange tubes. The products of combustion flow in the heat exchange tubes 20 and the water flows through the second fluid conduit 21, that is, around the tubes 20, and is channeled out of the heat exchanger assembly 14 via the water exit conduit 16. The hot combustion gases exit the heat exchanger assembly 14 via a combustion exhaust manifold 22. In another embodiment (not illustrated), the water flows through tubes in the heat exchanger assembly, and the hot combustion gases circulate around the tubes.

The water heating system 10 further includes a bypass conduit 24 connecting the water exit conduit 16 to the water inlet conduit 12. A pump 26 is adapted to circulate at least a portion of the heated water from the water exit conduit 16 to the cooler water inlet conduit 12. In one embodiment, the pump 26 is a constant flow model that continuously circulates a constant flow rate.

The water heating system 10 further includes sensors to monitor operational conditions of the system or system health parameters. On the liquid side of the system, a water inlet sensor 28 positioned upstream of the bypass conduit 24 can monitor the temperature of the incoming fresh water. A feed-forward sensor 30 mounted in the water inlet conduit 12 between the bypass conduit 24 and the heat exchanger assembly 14 can monitor, for example, the temperature of the water entering the heat exchanger after mixing with the heated water flowing in from the bypass conduit. A water exit sensor 32 can monitor the temperature or flow rate of the heated water leaving the heat exchanger assembly 14. On the combustion side of the system, an air inlet sensor 34 can monitor conditions such as the temperature of the air flowing to the burner assembly 18, and an exhaust sensor 36 can monitor conditions in the exhaust flue, such as temperature, which can be useful in determining combustion efficiency.

The water heating system 10 further includes a processor 38 (or CPU) which may be a microprocessor or microcontroller, and includes any suitable structure for controlling the overall operation of the water heating system. In one embodiment, the operation of the burner assembly 18 can be controlled responsive to the feed-forward sensor 30. In one example, the operation of the burner assembly 18 is controlled by the processor 38 responsive to the temperature of the mixed water entering the heat exchanger assembly 14 (e.g., fresh water plus recirculated water).

Water heating systems operate on the demand principle. That is, during operation the flow of heated water delivered through the water exit conduit is predicated upon facility demand. When there is no demand for hot water by the facility, no hot water flows out the conduit 16. In prior water heating systems, when there was no demand, there was no flow in the system. Thus, the temperature of the stagnant water in the system gradually decreased. In tankless systems, the temperature drop occurred fairly quickly because of the low volume of water in the system. When demand for hot water resumed, the temperature at the exit of the heat exchanger often was significantly less than the desired or set point temperature. The system, which controlled the burner assembly responsive to the water exit temperature, would respond by firing the burner at 100% for a prolonged period of time. Typically, the high heat rapidly being added to the heat exchanger caused the water exit temperature to spike and overshoot the set point, and the burner would throttle back. When the water exit temperature dropped below the set point, the burner would once again ramp up. This on/off operation of the burner resulted in repeated overshoot and undershoots of the set point, especially from a cold start. The problem could be mitigated somewhat with a proportional/integral/derivative (PID) controller, but the rising and falling heat output from the burner still resulted in thermal cycling of the heat exchanger components. The stress and strain on the heat exchanger components from the thermal cycling often resulted in premature failure of the components, which was expensive to repair.

In contrast, the water heating system described herein maintains a constant set point temperature by circulating some or all of the hot water exiting the heat exchanger assembly 14 back into the heat exchanger inlet. In this manner, the water in the system does not stagnate, and the temperature can be maintained without destructive swings from the set point. In one example, when there is no facility demand for hot water, and thus no flow from the water exit conduit 16, there remains flow circulating through the heat exchanger assembly because the flow from pump 26 circulates back into the inlet of the heat exchanger assembly 14. Since there is no demand, the volume of water in the system does not change and no fresh water is added to the system 10 from the water inlet conduit 12. As a result, the temperature of the water at the feed-forward sensor 30 will be very close to the set point temperature at the exit of the heat exchanger. The processor 38 may monitor the feed-forward sensor 30 and control the operation of the burner assembly 18 in response thereto. As the temperature of the water in the system gradually drops, the processor 38 can command the burner assembly 18 to operate in a fashion that restores the water exit set point temperature, as measured at the feed-forward sensor 30.

When demand for hot water by the facility resumes, the flow rate out the water exit conduit 16 is replenished by fresh water from the water inlet conduit 12. However, since the pump 26 is circulating a portion of the heated water back into the inlet of the heat exchanger assembly 14, the mixed water may be substantially warmer than the fresh water, and may require less heat from the burner assembly 18 to achieve the desired or set point temperature at the exit of the heat exchanger. Less heat input results in less thermal cycling of the heat exchanger components.

The feed-forward sensor 30 can sense the temperature, for example, of the mixed water entering the heat exchanger assembly 14. The processor 38 can monitor the output from the sensor 30 and command the operation of the burner assembly 18 in response. In one embodiment, an algorithm stored in memory of processor 38 defines a valve schedule for the fuel and air entering the burner assembly 18. The valve schedule is based upon the temperature sensed by the feed-forward sensor 30.

Figure 2:
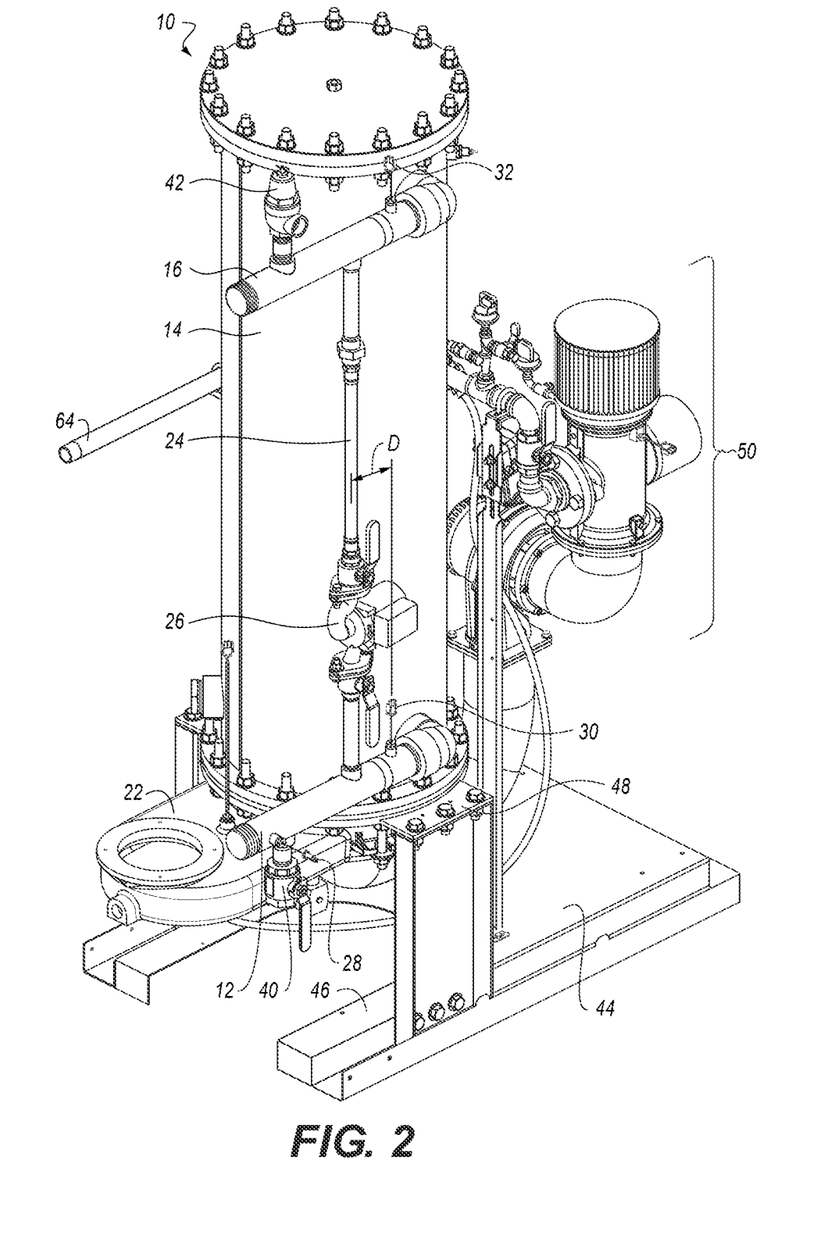
FIG. 2 depicts a perspective view of a water heating system in accordance with another embodiment of the invention.

Referring to FIG. 2, wherein like numbers indicate like elements from FIG. 1, a perspective view of a water heating system 10 is illustrated according to one embodiment of the invention. The components of the water heating system 10 may be arranged and constructed in accordance with the schematic diagram depicted in FIG. 1. The water heating system 10 includes a heat exchanger assembly 14 having a water inlet conduit 12 located at the base and a water exit conduit 16 located at the top. The water inlet conduit 12 includes a water inlet sensor 28, which in the illustrated example is an RTD-type (resistance temperature detector) thermocouple. A drain valve 40 may be coupled to the water inlet conduit 12 or otherwise positioned at the base of the heat exchanger assembly 14 to allow drainage of the water within the heat exchanger. The water exit conduit 16 can include a water exit sensor 32 to sense, for example, the temperature of the heated water leaving the heat exchanger assembly 14. In the illustrated example, the water exit sensor 32 is an RTD-type thermocouple. The water exit conduit 16 can further include a pressure relief valve 42 to vent the water pressure in the event of an overpressure in the line.

The water heating system 10 includes a bypass conduit 24 connecting the water exit conduit 16 to the water inlet conduit

12. A pump 26 is adapted to circulate at least a portion of the heated water from the water exit conduit 16 downward to the cooler water inlet conduit 12. In one embodiment, the pump 26 is a constant flow model that continuously circulates a constant flow rate through the bypass conduit 24. An exemplary pump 26 is a wet rotor circulator pump supplied by Taco Inc., Cranston R.I., configured to maintain 5 to 25 gallons per minute (GPM) of constant water flow. In an optional embodiment, the flow rate is about 15 GPM. In another embodiment, the flow rate through the heat exchanger assembly 14 stays constant, regardless of the flow of fresh water at the fresh water inlet. In yet another embodiment, the ratio between hot water and fresh water may be approximately 60% to 40%.

As described with reference to FIG. 1, a feed-forward sensor 30 is mounted in the water inlet conduit 12 between the bypass conduit 24 and the heat exchanger assembly 14 and can monitor, for example, the temperature of the water entering the heat exchanger after mixing with the heated water flowing in from the bypass conduit. In one embodiment, the feed-forward sensor 30 is positioned downstream (e.g., towards the heat exchanger assembly 14) a distance "D" from the tee section joining the bypass conduit 24 and the water inlet conduit 12 to assure proper mixing of the fresh water and the recirculated hot water. In one example, the distance "D" is at least 4 inches (10.2 cm).

The water heating system 10 may further include a mounting skid 44 comprising a base and vertical base legs. In one example, the base portion of the skid 44 includes stringers 46 to permit a fork lift or pallet truck to lift and transport the heating system. Mounting plates 48 (FIG. 2) may be welded to the heat exchanger assembly 14. The mounting plates 48, which support the entire water heating system 10, are bolted to the vertical legs of the skid 44. In this manner, the water heating system 10 may be secured to the skid 44 at the manufacturer, and easily transported, installed, and removed from a facility. In one embodiment, the skid 44 occupies a compact form factor to permit the water heating system 10 to be installed in a general utility closet. In one example, the form factor of the skid 44 is approximately 28 in. wide and approximately 51 in. deep (71.1×129.1 cm.).

Figure 3:
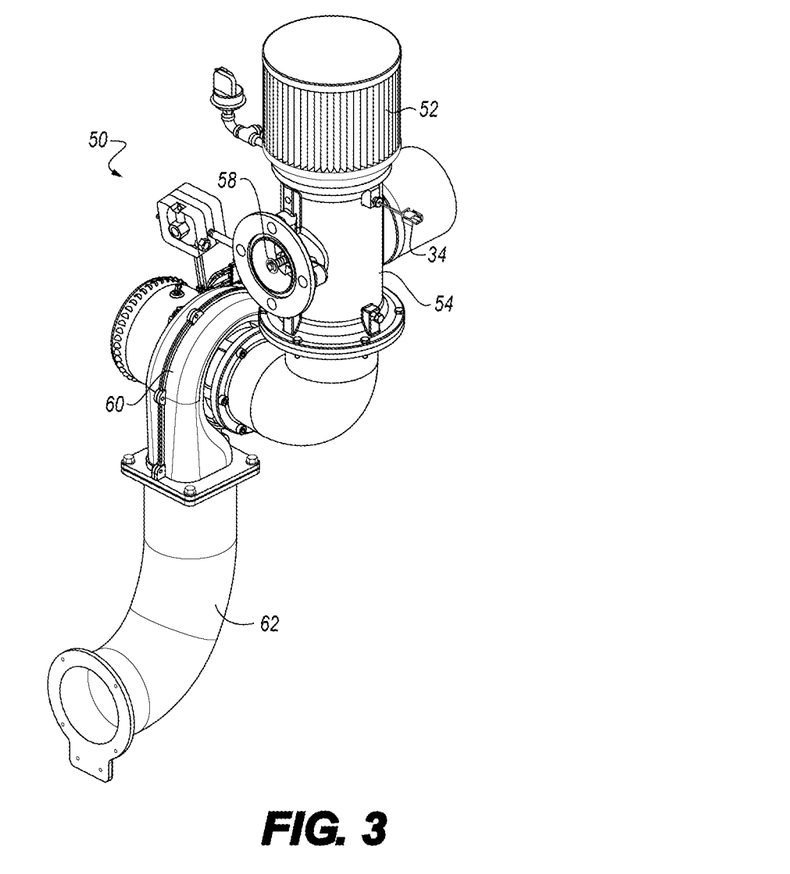
FIG. 3 depicts a perspective view of an air fuel delivery system in accordance with the embodiment shown in FIG. 2.

In one embodiment, the water heating system 10 includes an air fuel delivery system 50 that premixes the air and the fuel prior to entry into the combustion chamber of the burner assembly 18. FIG. 3 depicts a perspective view of an exemplary air fuel delivery system 50. The system 50 first includes an air filter 52 to remove airborne particulates from the air intake stream. An air inlet sensor 34 can provide data such as temperature measurements to assist in the operation of the water heating system 10. The intake air stream is mixed with fuel in an air fuel valve assembly 54. A gas train 56 (FIG. 4) connects to the air fuel valve assembly 54 at a fuel inlet flange 58 to provide gaseous fuel to the valve. A blower 60 propels the air/fuel mixture down a blower side intake manifold 62 to the burner assembly 18. In one example, the blower 60 can be a 8.9" (225 mm) variable speed brushless blower, such as the Nautilair1® brand blower available from Ametek Technical and Industrial Products in Kent, Ohio. In one embodiment, the air fuel valve assembly 54 provides a 20:1 turndown ratio for the operation of the burner assembly 18. That is, the fuel/air mixture ratio and the speed of the blower 60 can be adjusted to provide a heat source from the burner assembly 18 that is between 5% and 100% of the burner maximum output.

In other embodiments, the fuel and air may be channeled into the combustion chamber separately. For example, an air conduit and a fuel conduit can be separately coupled to the burner assembly to deliver air and fuel, respectively.

Figure 4:
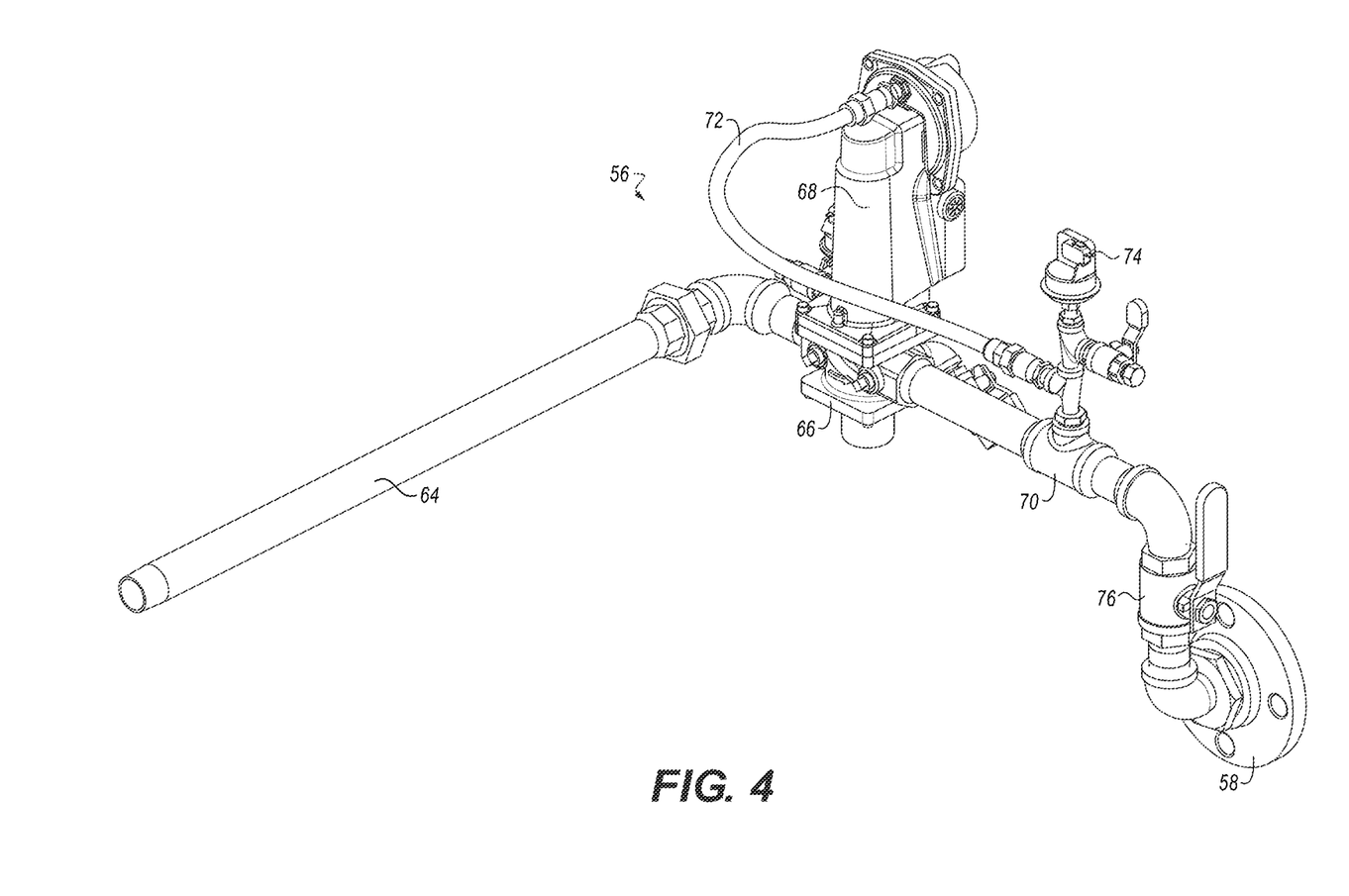
FIG. 4 depicts a perspective view of a gas train in accordance with the embodiment shown in FIG. 2.

FIG. 4 depicts a perspective view of the fuel gas train 56 that is partially hidden from view in FIG. 2. The fuel can include a plurality of suitable gases, for example compressed natural gas (CNG). The chemical composition of the CNG can vary and many suitable compositions are contemplated herein. In one embodiment, the CNG comprises methane, ethane, propane, butane, pentane, nitrogen ($N_2$), and carbon dioxide ($CO_2$). The gas train 56 flows the fuel down a supply conduit 64 to a safety shutoff valve (SSOV) 66 that is opened and closed by SSOV actuator 68. The actuator 68 may be driven by a regulator that is connected to a downstream pressure source, such as tee 70 and flexible gas tube 72. The flow through the gas tube 72 may be governed by a pressure switch 74 adapted to remain closed unless a minimum threshold gas pressure is reached, for example 4.0 inches of water column. In another example, the gas train 56 may also have a low gas pressure switch (not shown) that enables the SSOV actuator 68 to close if the fuel pressure falls below a predefined limit, such as 2.6 inches of water column. The gas train 56 may also include a manual shutoff valve 76, such as a 1" ball valve. The gas train 56 terminates at the fuel inlet flange 58, which is connected to the air fuel valve assembly 54 (FIG. 3).

Figure 5:
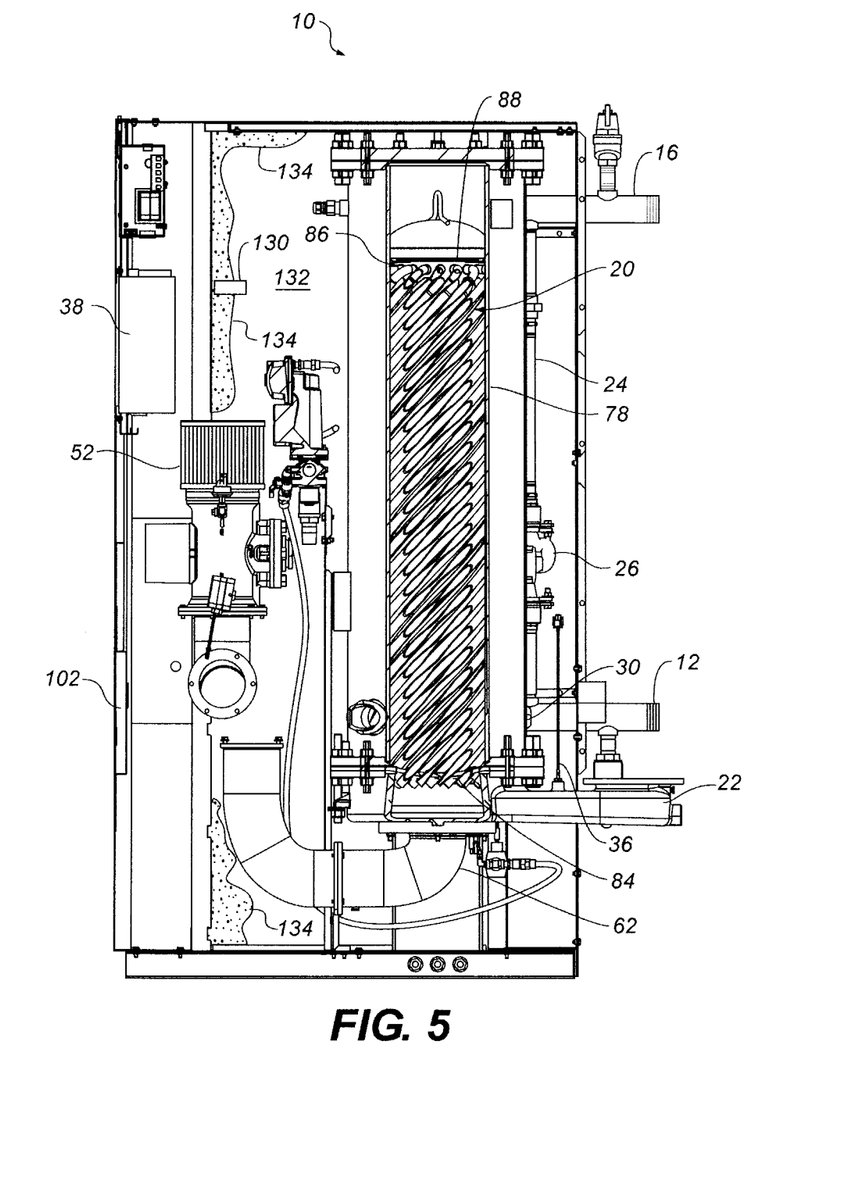
FIG. 5 depicts a cross sectional side view of the water heating system shown in FIG. 2.
Figure 6:
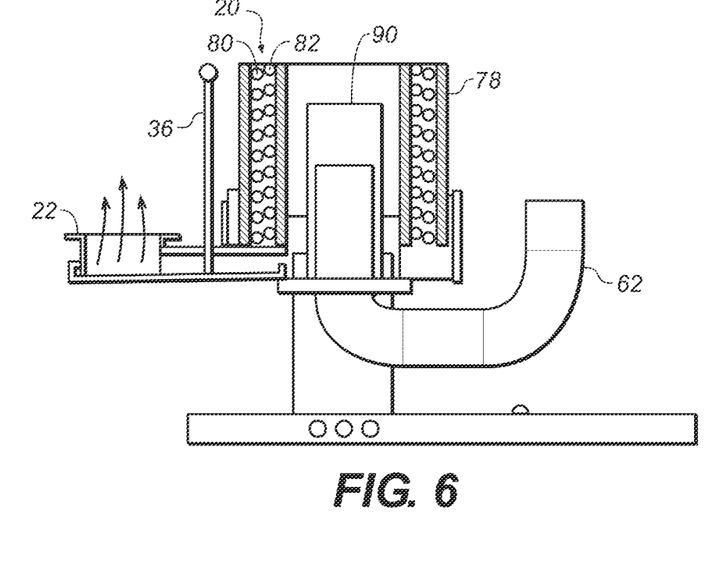
FIG. 6 depicts a cross sectional side view of a burner assembly in accordance with the embodiment shown in FIG. 5.
Figure 7:
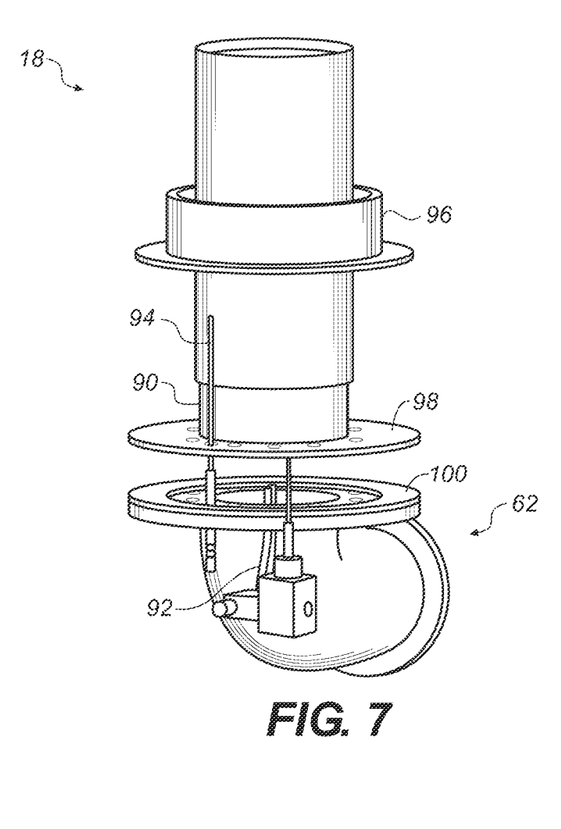
FIG. 7 depicts a perspective exploded view of the burner assembly shown in FIG. 6.

FIG. 5 depicts a cross sectional side view of the water heating system shown in FIG. 2, FIG. 6 depicts a cross sectional side view of the burner assembly 18, and FIG. 7 depicts a perspective exploded view of the burner assembly 18. Referring to FIGS. 5-7, the heat exchanger assembly 14 includes a cylindrical shell 78 into which one or more heat exchange tubes 20 are secured. The shell 78 may be fabricated from stainless steel in one example. The water to be heated flows into the shell 78 from the water inlet conduit 12 and exits the shell to the water exit conduit 16. The system 10 is a tankless design in that there is no holding tank for the heated water. The only volume of water in the system 10 is that flowing within the interior of the shell 78.

In one embodiment of the present invention, the heat exchange tubes 20 comprise an outer tube 80 coiled in helical fashion and an inner tube 82 disposed within the outer tube 80, also coiled in helical fashion. In one example construction, a tube sheet 84 is provided to secure the heat exchange tubes 80, 82 at the bottom of the heat exchange system 10. The tube sheet 84 comprises a round, convex, stainless steel plate with a center opening. The sheet 84 has through holes machined in at an acute angle to accept the helix wound tubes 20. The heat exchange tubes 20 are also bent at complimentary acute angles, and are brazed into the sheet 84. The tube sheet 84 may be brazed or otherwise sealed on its inner diameter to the burner assembly 18 (which fits therethrough) and on its outer diameter to the shell 78.

At the top of the heat exchanger assembly 14, the heat exchange tubes 80, 82 are brazed or otherwise secured to a baffle assembly 86 that is positioned between the shell 78 of the water heater and the top of the combustion chamber to funnel water flow around the helix tubes 20. The baffle assembly 86 provides a dual benefit by preventing or at least mitigating scale build-up and locally reducing surface temperatures. In one embodiment, the high velocity baffle assembly 86 is a round stainless steel plate with a concentric hole, or center orifice. The baffle assembly 86 may include machined holes distributed evenly radially therearound to accept the helix tubes 20. The center orifice provides the benefit of channeling or directing the upwardly-flowing water within the second fluid conduit 21 to a localized area. The orifice provides a constriction to locally increase the water velocity. In one example, the orifice is sized to provide a water velocity greater than 8 feet per second. By increasing the local water velocity, build up of scale on the surface of the heat exchange tubes 20 is prevented or at least significantly delayed, which increases the operational life of the heat exchanger. In addition, increasing the local water velocity keeps the component surface temperatures cooler. This is particularly important near the top of the heat exchanger, since the temperatures are highest at the exit of the combustion chamber. A baffle gasket 88 made of an elastomeric material may also be installed between the baffle assembly 86 and the shell 78. The baffle gasket 88 keeps water from flowing between the baffle assembly 86 and the shell 78.

The helical tubes 20 (e.g., 80, 82) can be fabricated from stainless steel and may include grooves or the like on the tube exterior surface. The grooves increase the velocity and turbulence of the water flowing over the tubes 20, which improves the heat transfer from the hot gases to the water. The helix configuration also reduces the stresses caused by tube thermal expansion and contraction. Although the tubes are constrained at each end (e.g., brazed at the tube sheet 84 and the baffle assembly 86) the helical geometry allows significant expansion and contraction without overstressing the braze joints.

The components within the shell 78 of the heat exchanger assembly 14, such as the heat exchange tubes 20, the tube sheet 84, and the baffle assembly 86, may include corrosion protection to reduce corrosion effects from the fresh water. In one embodiment, the components are electroless nickel plated. In one example, the nickel plating can be in the range of 0.0003 inches to 0.001 inches. The combination of welding and brazing the stainless steel components and providing an electroless nickel plating finish improves the life of the heat exchanger.

The heat exchanger assembly 14 further includes a burner assembly 18 to provide the heat source to raise the temperature of the water flowing in the heat exchange tubes 20. In the illustrated embodiment, the burner assembly 18 mates and seals to the bottom of the shell 78. The burner assembly 18 includes a cylindrical combustion chamber 90 extending upwardly through the open center portion of the helical heat exchange tubes 20. At the terminal end of the combustion chamber, near the top of the shell 78, the products of combustion (e.g., hot gases) and are directed into an open end of the heat exchange tubes 20 located in the baffle assembly 86. The hot gases then flow downwardly in the tubes 20 around the outside of the combustion chamber and ultimately out the combustion exhaust manifold 22 at the base of the assembly. At the same time, water flows around the tubes 20 in an upward direction, from the water inlet conduit 12 towards the water exit conduit 16 at the top of the assembly.

Depicted in FIG. 7 is an exploded perspective view of the burner assembly 18. The fuel/air mixture enters through the blower side intake manifold 62 and is ignited in the radial combustion chamber 90. The burner assembly 18 can include a solenoid-activated igniter 92 and a flame detector 94, such as a flame rod, the output of which is sent to the system microprocessor 38 or CPU. The CPU can command a safe shutdown in the event the flame rod indicates combustion has terminated prematurely. The burner assembly 18 can also include a condensate shield 96 to provide a moisture barrier to protect the igniter 92 and other components from liquid water that may drip down from the heat exchange tube 20 during temperature excursions, cool-down, or the like. The burner assembly 18 mounts to the intake manifold 62. In one embodiment, a mating plate 98 bolts to a flange on the intake manifold 62, and a high temperature seal 100, such as a Fiberfrax® gasket, protects the intake manifold from the heat generated by the combustion chamber 90.

FIGS. 8A-8D depict external perspective views of the water heating system 10 shown in FIG. 5. Referring to FIGS. 5 and 8A-8D, the water heating system 10 may include a sealed combustion enclosure 102 that provides operational advantages over conventional enclosures or cabinets. In one aspect, the enclosure 102 provides a means to condition the incoming air to the burner assembly 18. In another aspect, the enclosure 102 provides a means to assure quiet operation of the water heating system.

Figure 8A:
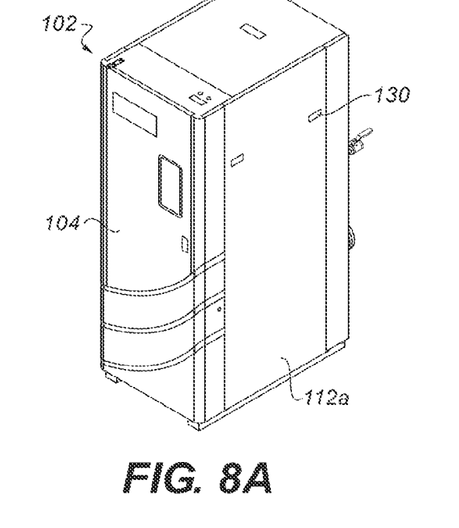
FIGS. 8A and 8C depict a perspective front and right side view of an exemplary enclosure for the water heating system shown in FIG. 5.
Figure 8B:
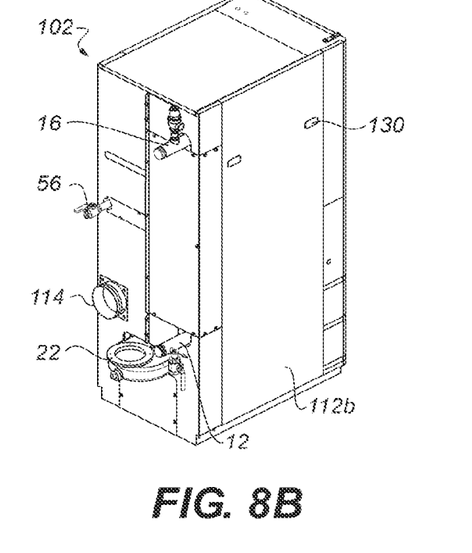
FIGS. 8B and 8D depict a perspective rear and left side view of an exemplary enclosure for the water heating system shown in FIG. 5.
Figure 8C:
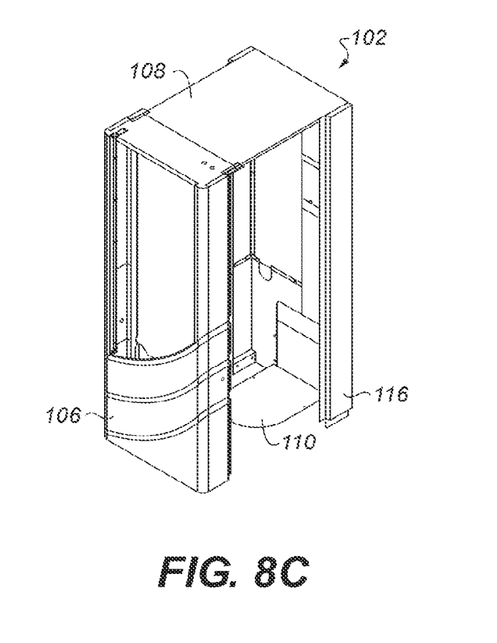
Figure 8D:
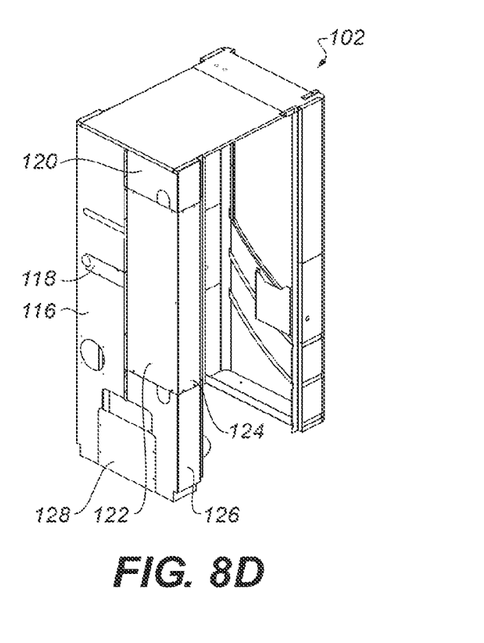

The enclosure 102 may be fabricated from sheet metal panels and assembled in such a manner as to provide a sealed internal environment. FIGS. 8A-8C depict one embodiment of a sealed enclosure 102. The enclosure 102 includes a front door assembly 104 and a front panel 106. Although not illustrated in FIG. 8A, the front door assembly 104 opens to provide access to the electrical panel, switches, the I/O wiring box assembly, the power box assembly, the programmable C-More RS232 control interface, and the air filter 52, for example. The sealed enclosure 102 further includes a top panel 108, a base cover panel 110, right side panel 112a, and left side panel 112b. The rear face of the enclosure 102 may include a plurality of covers and panels to enclose the water inlet conduit 12, the water exit conduit 16, an air intake port 114, the combustion exhaust manifold 22, the gas train connection 56, and other traps and drains. In one embodiment, the rear face of the sealed enclosure 102 includes a left rear panel 116, a pipe cover 118, an upper right rear panel 120, an access panel 122, a right side panel 124, a right rear lower panel 126, and a rear lower panel 128. Together, the panels interlock or otherwise secure together to provide a sealed enclosure. In one embodiment, the panels include integral, quick-release, quarter-turn latches 130 for ease of access to major components for replacement and/or maintenance. The latch design keeps the entire enclosure 102 tightly sealed during normal operation and allows service without the use of tools for the removal of time-consuming fasteners.

In one aspect of the invention, the enclosure 102 provides a means to condition the incoming air to the burner assembly 18. In one example, conditioning includes filtering the air. The enclosure 102 defines a plenum 132 (FIG. 5) for a combustion air filtration system. The combustion air filtration system reduces the likelihood that micron-size particulates enter the burner assembly 18 and clog important burner material that would otherwise require expensive service due to poor combustion. In one example, the air filter 52 coupled to the air fuel delivery system 50 is located within the enclosure, such that the air stream for the air fuel valve assembly 54 is drawn from the plenum 132. In one optional embodiment, the filtration efficiency of the disclosed system, when tested to ISO 5011, is in a range from approximately 96% to approximately 99%.

In another example, the enclosure 102 conditions the incoming air by stabilizing the temperature range of operation. In this respect, the water heating system 10 further includes a preheated combustion air delivery system. The plenum 132 defined by the enclosure 102 serves to mitigate the temperature extremes of the outside environment and supply air to the burner assembly 18 in stable temperature range. For example, outside air temperatures used for combustion typically range from −20° F. to 120° F. (−28.9° C. to 48.9° C.) which represents a 140° F. (77.8° C.) difference, or delta, that the system must accommodate. The preheated combustion air delivery system reduces the operating air temperature range down to approximately 50° F. to 90° F. (10.0° C. to 32.2° C.), a 40° F. (22.2° C.) delta. This smaller range of operating temperature improves combustion stability due to the reduction in air density attributed to the temperature change. For example, when the outside temperature is above 90° F., the air is mixed with indoor room air to reduce its temperature. When the outside air is below 50° F., since the enclosure is insulated, the air introduced into the enclosure 102 absorbs at least some of the heat therein.

In another aspect of the invention, the enclosure 102 provides a means to assure quiet operation of the water heating system. The enclosure 102 can be lined with acoustical sound proof material 134 to reduce the ambient noise emanating from the enclosure during operation. In one example, the sound pressure level measured outside the enclosure 102 is approximately 55 dBa when the unit is operating at 100% of input (full capacity). This sound level is comparable to the low volume setting of a radio or television at a distance of 3.3 feet (1 m). The insulation 134 has the further advantage of reducing standby losses below 1% in an optional embodiment.

As disclosed hereinabove, the data output of the system sensors, such as water inlet sensor 28, feed-forward sensor 30, or water exit sensor 32, may be connected to a processor 38 (FIG. 5) that is adapted to operate the water heating system 10 or monitor the health of the system. In operation, at least a portion of the processor 38 (or, in some embodiments, a separate processor) may be configured as a dynamic load anticipator. When the bypass pump 26 is running, the dynamic load anticipator (DLA) can control the water exit temperature in response to input from the feed-forward sensor 30. In one embodiment, the DLA is programmed with an algorithm to control the outlet temperature of the water heater. In this embodiment, the temperature is controlled to within 2° F. under dynamic load (flow) changes based on changes of the feed-forward temperature sensor 30 measurement. The processor 38 commands the modulation of the gas fired air fuel combustion system 18 from 5% to 100% of input, for example.

Table I depicts one example algorithm that may be programmed into the processor 38. In this example, the water heating system 10 provides 1 million BTU per hour to supply a continuous water demand rate of 50 gallons per minute at a temperature of 136° F., with the bypass pump 26 circulating approximately 15 GPM. The feed-forward temperature sensor 30 provides data indicating the mixed water temperature entering the heat exchanger assembly 14 which, when compared to a set point or desired outlet temperature, can be used to calculate how much thermal energy needs to be added to the heat exchange tube 20. Because at least a portion of the heated water from the water exit conduit 16 is circulated back into the water inlet conduit 12, and the circulated flow rate is a known or fixed value, the amount of thermal energy needed to raise the temperature to the set point can be predicated on the circulated flow rate. In an optional embodiment, the water exit sensor 32 may provide the temperature of the water leaving the heat exchanger assembly 14 to the processor 38 for additional or supplemental calculations to the algorithm.

TABLE 1

| Feed-Forward Temperature Sensor Input | Air/Fuel Valve Position (% Open) |
|---|---|
| 85° F. | 100% |
| 86° F. | 90% |
| 87° F. | 80% |
| 88° F. | 70% |
| 89° F. | 60% |
| 90° F. | 50% |
| 94° F. | 40% |
| 103° F. | 30% |

TABLE 1-continued

| Feed-Forward Temperature Sensor Input | Air/Fuel Valve Position (% Open) |
|---|---|
| 118° F. | 20% |
| 134° F. | 10% |
| 136° F. | 0% |

In one embodiment, the processor 38 may also monitor the difference between the water inlet sensor 28 and the feed-forward sensor 30 to confirm that the bypass pump 26 is operating properly. In one example, the water inlet sensor 28 and the feed-forward sensor 30 measure temperature. If the pump 26 fails, no heated water is mixed with the fresh water, and there will be a negligible difference in temperature between the water inlet sensor 28 and the feed-forward sensor 30. In this event, the processor 38 can command the water heating system 10 to switch to a failsafe mode of operation, such as a feedback control mode. In the feedback control mode, the operation of the burner assembly 18 is in response to the water exit sensor 32. The processor 38 may also issue a fault indicator to a readout on the front door assembly 104, for example. This action does not terminate or lock out operation of the water heating system 10, but provides the operator an indication that there is a malfunction.

The water inlet sensor 28 may also provide additional data to the algorithm in the DLA to aide in determining how much thermal energy needs to be added to the inlet water.

In another embodiment, the processor 38 may also monitor the combustion exhaust sensor 36 to monitor the flue gas temperature of the water heating system 10 as a measurement of thermal/combustion efficiency. If the surfaces of the heat exchange tubes 20 become scaled, efficiency will be reduced and the flue gas temperature will increase. In one example, the processor 38 can issue a warning when the flue gas temperature 36 reaches a first threshold value. Should the temperature 36 reach a second, higher threshold value, the processor 38 can command the air fuel delivery system 50 to alter the air/fuel ratio in order to maintain efficiency. In the event a third, higher threshold value is reached, the water heating system 10 will fault, turn off, and require cleaning of the heat exchanger assembly 14. The graduated threshold limits and subsequent operator notification of maintenance reduces the likelihood that the heat exchanger assembly 14 will suffer damaging corrosion.

While the present invention has been described with reference to a number of specific embodiments, it will be understood that the true spirit and scope of the invention should be determined only with respect to claims that can be supported by the present specification. Further, while in numerous cases herein wherein systems and apparatuses and methods are described as having a certain number of elements it will be understood that such systems, apparatuses and methods can be practiced with fewer than the mentioned certain number of elements. Also, while a number of particular embodiments have been described, it will be understood that features and aspects that have been described with reference to each particular embodiment can be used with each remaining particularly described embodiment.

A sample of methods that are described herein are as follows:

A method for operating a water heating system, comprising the steps of:

providing a heat exchanger assembly, a water inlet conduit for providing water to the heat exchanger assembly, a water exit conduit connected to the heat exchanger assembly for providing heated water to a demand, a heat source for heating the water in the heat exchanger assembly, and a bypass conduit connecting the water exit conduit to the water inlet conduit;

heating water in the heat exchanger to a set point temperature;

mixing at least a portion of the heated water from the bypass conduit with the water in the water inlet conduit;

monitoring a first parameter of the water in the water inlet conduit prior to entry into the heat exchanger assembly; and controlling the heat source in response to the first parameter of the water to achieve the set point temperature at the water exit conduit.

The method wherein the step of flowing at least a portion of the heated water from the water exit conduit to the water inlet conduit comprises pumping the heated water to the water inlet conduit at a constant flow rate.

The method wherein the first parameter being monitored is temperature and the heat source is a burner assembly, and the step of controlling the heat source comprises adjusting the modulation of an air fuel valve for the burner assembly.

The method further comprising the steps of providing a water exit sensor at the water exit conduit, monitoring the water exit sensor, and further controlling the heat source in response to the water exit sensor.

The method wherein the heat source is a burner assembly, and the method further comprises the step of providing a sealed enclosure for the water heating system, the enclosure defining an internal air plenum, the method further comprising the step of conditioning the air in the plenum prior to entry in the burner assembly.

The method wherein the step of conditioning the air in the plenum comprises filtering the air.

The method wherein the filtering step achieves a filtration efficiency in a range from approximately 96% to approximately 99%, when tested to ISO 5011.

The method wherein the step of conditioning the air in the plenum comprises pre-heating the air to a temperature range of approximately 50° F. to approximately 90° F.

The method further comprising the step of locally increasing the velocity of water within the heat exchanger assembly to mitigate scale build-up.

The method wherein the velocity is increased to at least 8 feet per second.

What is claimed is:

1. A water heating system, comprising:

a burner assembly for providing a source of thermal energy, the burner assembly comprising a combustion chamber, an air intake to supply an air stream to an air fuel delivery system, and a fuel inlet to supply fuel to said air fuel delivery system wherein said air stream and said fuel are mixed to form an air/fuel mixture, and a blower to blow said air fuel mixture into the combustion chamber where said air/fuel mixture is ignited to produce products of combustion;

a water inlet conduit coupled to a heat exchanger assembly for supplying fresh water to be heated, said heat exchanger assembly operatively coupled to the burner assembly, the heat exchanger assembly comprising a first fluid conduit in heat exchange relationship with a second fluid conduit, wherein said water to be heated flows in either of said first fluid conduit or said second fluid conduit and said products of combustion flow in the other of said first fluid conduit or said second fluid conduit;

a water exit conduit coupled to the heat exchanger assembly for delivering the heated water to a point of use;

a bypass conduit connecting the water exit conduit to the water inlet conduit and circulating only water flows from the water exit to the water inlet conduit;

a constant flow pump disposed in the bypass conduit to circulate at least a portion of the heated water from the water exit conduit to the water inlet conduit, that continuously circulates a constant flow rate through the bypass conduit thereby providing a mix of fresh water and recirculated water to the heat exchanger assembly;

a feed-forward sensor positioned in the water inlet conduit having flowing within said water inlet conduit said mix of fresh water and recirculated water, said feed-forward sensor disposed between the heat exchanger assembly and the bypass conduit for monitoring a parameter of said mix of fresh water and recirculated water entering the heat exchanger assembly; and a processor for controlling the operation of the burner assembly by a feed-forward control system to maintain a temperature of the heated water to the point of use in response to the feed-forward sensor.

2. The water heating system according to claim 1, wherein the heat exchanger assembly is a tankless design.

3. The water heating system according to claim 1, wherein the burner assembly comprises a combustion chamber adapted to burn a fuel and an oxidizer to form gaseous combustion products, the water heating system further comprising a combustion exhaust manifold to channel the combustion products out of the water heating system.

4. The water heating system according to claim 3, wherein the first fluid conduit comprises a heat exchange tube, a first end of the heat exchange tube coupled to the combustion products of the burner assembly and at a second, opposing end of the heat exchange tube coupled to the combustion exhaust manifold.

5. The water heating system according to claim 4, wherein the heat exchange tube is helical.

6. The water heating system according to claim 5, wherein the heat exchange tube comprises an outer helical tube in surrounding relationship to an inner helical tube, said inner helical tube disposed inside a diameter of a path of said outer helical tube.

7. The water heating system according to claim 1, wherein the feed-forward sensor is a temperature sensor.

8. The water heating system according to claim 1, wherein the processor commands operation of the burner assembly according to an algorithm stored in the processor, the algorithm having as an input a reading from the feed-forward sensor and having as an output a modulation of the burner assembly.

9. The water heating system according to claim 8, further comprising an air fuel delivery system adapted to premix a fuel and an oxidizer prior to entry into the burner assembly, the modulation of the burner assembly comprising an air fuel valve position of the air fuel delivery system.

10. The water heating system according to claim 8, further comprising a water exit sensor for monitoring a parameter of the heated water flowing in the water exit conduit, the water exit sensor positioned between the heat exchanger assembly and the bypass conduit.

11. The water heating system according to claim 10, wherein the water exit sensor provides an input to the algorithm stored in the processor.

12. The water heating system according to claim 1, further comprising a water inlet sensor for monitoring a parameter of the fresh water flowing in the water inlet conduit, the water inlet sensor positioned upstream of the bypass conduit.

13. The water heating system according to claim 12, wherein the processor monitors the water inlet sensor and the feed-forward sensor for the purpose of determining whether the bypass pump is operating properly.

14. The water heating system according to claim 13, wherein the processor calculates the temperature difference between the water inlet sensor and the feed-forward sensor and, if the difference is negligible, the processor controls the operation of the of the burner assembly in response to a different parameter.

15. The water heating system according to claim 14, wherein the processor controls the operation of the burner assembly in response to a water exit temperature sensor in the water exit conduit.

16. The water heating system according to claim 1, wherein the heat exchanger assembly further comprises a baffle assembly to increase the velocity of the water in the second fluid conduit.

17. The water heating system according to claim 16, wherein the baffle assembly comprises a plate, the plate defining an orifice through which the velocity of the water increases.

18. The water heating system according to claim 1, wherein the mix of fresh water and recirculated water provided to the heat exchanger assembly is defined by a ratio of approximately 40% fresh water and 60% recirculated water.

19. The water heating system according to claim 1, further comprising a sealed enclosure defining a plenum, the plenum coupled to the air intake of the burner assembly.

20. The water heating system according to claim 19, wherein the plenum provides for a combustion air filtration system within the enclosure, the combustion air filtration system comprising an air filter coupled to the burner assembly to remove airborne particulates from the air intake stream.

21. The water heating system according to claim 20, wherein the air filter provides filtration efficiency in a range of about 96% to 99%, when tested to ISO 5011:2000.

22. The water heating system according to claim 19, wherein the plenum provides for a preheated combustion air delivery system to mitigate temperature extremes outside the enclosure, the preheated combustion air delivery system providing intake air to the burner assembly in a temperature range of about 50° F. to 90° F. when the outside temperature is in a range from approximately −20° F. to approximately 120° F.

23. The water heating system according to claim 19, further comprising acoustical sound proof material coupled to an interior surface of the enclosure to reduce the ambient noise emanating from the enclosure during operation.

24. The water heating system according to claim 23, wherein a sound pressure level measured outside the enclosure is approximately 55 dBa when the water heating system is operating at full capacity.

25. The water heating system according to claim 19, wherein the bypass conduit is located within the enclosure.

* * * * *